Oct. 31, 1950 T. B. GIBBS ET AL 2,528,271
REEL
Filed May 14, 1945
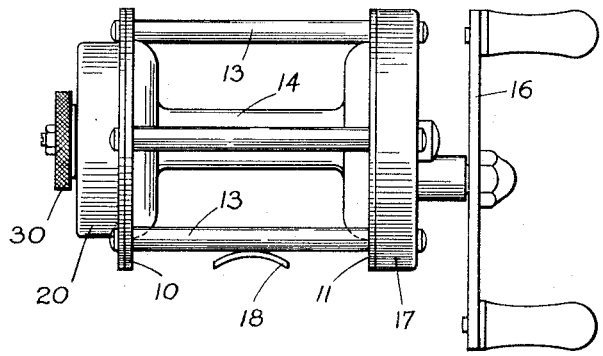
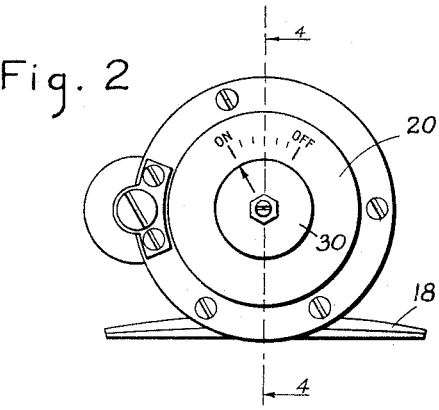
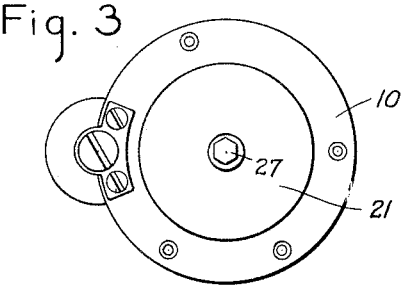
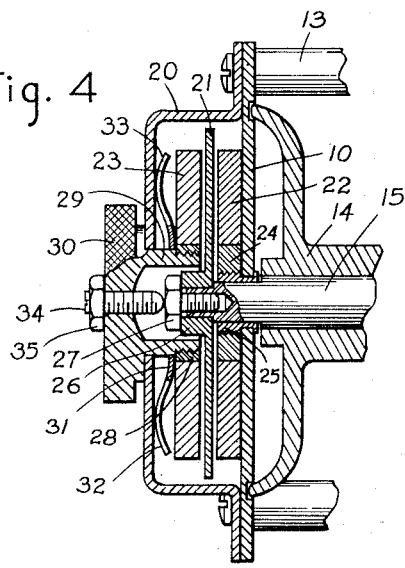
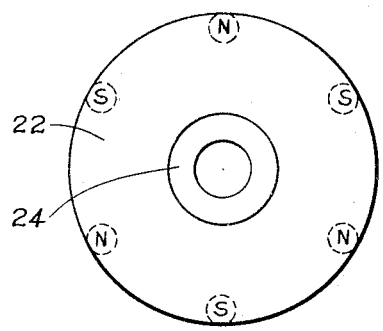
INVENTORS
THOMAS B. GIBBS
GORDON F. LAING
BERNARD A. WARMEY
BY R. G. Richardson
ATTY Patented Oct. 31, 1950

2,528,271

UNITED STATES PATENT OFFICE 2,528,271

REEL

Thomas B. Gibbs, Gordon F. Laing, and Bernard A. Warmey, Delavan, Wis., assignors to The George W. Borg Corporation, Chicago, Ill., a corporation of Delaware Application May 14, 1945, Serial No. 593,656

4 Claims. (Cl. 172—285)

The present invention relates in general to reels, but more in particular to fishing reels, and the object of the invention is to produce a new and improved device of this character.

A special object is to produce a new and improved anti-backlash mechanism for controlling the reel spool in casting, to prevent overrunning of the spool and consequent snarling or tangling of the line.

The invention will be described more in detail hereinafter, reference being had to the accompanying drawing, in which—

Fig. 1 is a view in elevation showing a fishing reel embodying the invention;

Fig. 2 is an end view of the same;

Fig. 3 is an end view with the housing for the anti-backlash mechanism removed;

Fig. 4 is a partial section of the line 4—4, Fig. 2; and

Fig. 5 is a plan view of one of the ring magnets which are included in the anti-backlash mechanism.

Referring to the drawings, the fishing reel shown in Fig. 1 is for the most part of conventional design and need not be described in detail. The various parts are supported on a frame which comprises the end plates 10 and 11 and a plurality of pillars such as 13 by means of which the end plates are rigidly secured together in spaced relation. The reference character 14 indicates the usual reel spool, which is mounted on a shaft 15 having bearings at the end plates 10 and 11. The spool 14 is rotated by the crank 16 through the medium of multiplying gears which are enclosed in the housing 17. The curved plate or saddle 18 affords means for mounting the reel on a fishing rod.

The anti-backlash mechanism is enclosed in a housing 20 at the opposite end of the reel from the housing 17 and consists essentially of the metallic disc 21 and the two ring magnets 22 and 23. The construction and arrangement of these and the associated parts will be explained more in detail.

The ring magnet 22 is shown in Figs. 4 and 5 and is preferably made of the magnetic material known as Alnico, although other magnetic materials could be used. The magnet is magnetized so as to exhibit a circular row of alternate North and South poles as shown in Fig. 5. There should be an even number of poles and the number of poles should be so selected as to produce the maximum efficiency, having regard to the size of the magnet and the magnetic material employed. In the case of a ring magnet made of Alnico and having a diameter of approximately one and three-sixteenths inches, six poles have been found to give excellent results.

The magnet 22 is provided with an insert 24, having a tapped hole at the center, by means of which the magnet is supported on the bearing member 25. The insert 24 may be made of iron and is preferably soldered to the magnet. The bearing member 25, which provides one of the bearings for the shaft 15, is threaded for a part of its length. The unthreaded part of the bearing member is of reduced diameter and extends through a hole in the end plate 10, to which the bearing member is secured by a spinning operation. The magnet 22 with the insert 24 is screwed onto the projecting threaded part of the bearing member and rests against the end plate 10 of the frame.

The disc 21 should be made of good conducting material, such as copper, and has a hub 26 by means of which it is supported on the shaft 15. The shaft has a shoulder just outside the bearing member 25 and the hub 26 is clamped against this shoulder by means of a suitable machine screw 27. A machine screw having the usual right hand thread should be used, so that the sudden acceleration of the spool which occurs in casting will tend to tighten the screw rather than loosen it. However, other known arrangements for rigidly securing the disc to the shaft can be used.

The ring magnet 23 is similar to the ring magnet 22 and has an insert 28 with a tapped hole at the center. The magnet 23 is supported on a thimble which has a knurled head or knob 30, a shank portion 29 which extends through a hole in the housing 20 and terminates in a shoulder, and a threaded portion of reduced diameter beyond the shoulder. The construction will be clear from Fig. 4, where it will be seen that the magnet 23 is screwed on to the threaded part of the thimble and rests against the said shoulder.

The thimble above referred to is rotatable relative to the housing 20 by means of the knob 30. The knob has a bearing against the outside of the housing where it is held by means of a friction device which is compressed between the magnet 23 and the housing 20. This friction device comprises a washer 31, which rests against the magnet 23, or rather the insert 28, and a plurality of spring leaves such as 32 and 33 which may be formed integrally with the washer 31 and bear against the inside wall of the housing 20. There should preferably be at least four of these spring leaves, which should be stiff enough to hold the knob 30 firmly in adjusted position but not so stiff as to prevent ready rotation thereof.

There is a tapped hole at the center of knob 30 in which is threaded the screw 34, which provides a thrust bearing for the shaft 15. The screw 34 has a rounded end which bears against the head of screw 27, and is held in adjusted position by means of a locknut 35. It will be understood that the shaft 15 has another suitable thrust bearing at the other end. These bearings enable excessive end play in the shaft to be avoided and should be so adjusted that the disc 21 is substantially centrally disposed between the magnets 22 and 23.

The thimble hereinbefore referred to is rotatably mounted on the housing 20 to enable the magnet 23 to be adjusted relative to the magnet 22, this adjustment being carried out by rotation of the knob 30. In order to indicate the position of magnet 23 the knob 30 has an arrow suitably marked thereon as shown in Fig. 2, and the housing 20 has a scale extending over an arc of 60 degrees. The main positional marks at the opposite ends of the scale are labeled "on" and "off," respectively.

In the "on" position of the knob 30 the magnet 23 is so oriented relative to the magnet 22 that the poles of magnet 23 are opposite or aligned with unlike poles of magnet 22, with the result that the two magnets cooperate and assist each other in establishing a magnetic field the lines of force of which pass through the disc 21. In the "off" position of the knob 30, however, the magnet 23 is rotated 60 degrees from its former position and each pole of said magnet is opposite a like pole of magnet 22. In this position of magnet 23, therefore, the two magnets oppose each other and establish separate magnetic fields which are substantially entirely outside the disc 21. As regards intermediate positions of the knob 30 and magnet 23 it will be clear that the magnets will assist or oppose each other more or less depending on the position and that intermediate values of effective field strength will result. Thus a variable effective field strength is made available which ranges from a maximum in the "on" position of the knob 30 to a minimum which is substantially zero in the "off" position.

When the reel is in use the disc 21 rotates in the magnetic field produced by the magnets 22 and 23 and eddy currents are generated in the disc. Power is required to rotate the disc, therefore, which manifests itself as a force opposing the rotation. This force or drag depends upon the strength of the magnetic field and upon the angular velocity of the disc.

In bait casting, the bait attains a maximum velocity very shortly after it leaves the casting rod, producing a correspondingly high speed rotation of the reel spool. The spool speed may be on the order of 15,000 R. P. M., or higher. As soon as the initial force applied to the bait has been expended, it begins to slow down, due mainly to air resistance. In the ordinary reel there is no corresponding force opposing the rotation of the reel spool and it tends to overrun the line and produce a backlash. This tendency is commonly overcome by "thumbing" the reel, an operation which, if expertly performed, will slow down the reel spool in proportion to the decrease in velocity of the bait and thus avoid a backlash. It is difficult to apply the correct amount of braking force to the reel spool at the right time, however, and for this reason the more or less inexperienced bait caster is unable to secure consistently satisfactory results.

With a reel embodying the invention the necessity for "thumbing" the reel spool is eliminated, since the disc 21, rotating in the magnetic field, creates a braking effect or drag which automatically slows down or decelerates the reel spool at approximately the same rate that the air resistance decelerates the bait. The danger of backlash is thus avoided, and at the same time no excessive tension or back pull is put on the line, which permits the substantially unimpeded flight of the bait insofar as the reel is concerned.

The amount of drag can be adjusted for different bait weights and sizes, different wind conditions, etc., by rotation of the knob 30. As previously explained, the strength of the effective field, which produces the braking effect or drag in the rotating disc can be adjusted from a maximum value through various intermediate values ranging down approximately to zero.

It will be seen, therefore, that the invention provides a highly improved reel, substantially immune to backlash, and makes it possible for the amateur fisherman to quickly attain results in bait casting which were heretofore only attainable after long practice.

The invention having been described, that which is believed to be new and for which the protection of Letters Patent is desired will be pointed out in the appended claims.

We claim:

1. In a reel, a frame, a spool shaft, means including a bearing member for supporting said shaft in said frame, a disc of conductive material mounted on said shaft outside said frame, and a permanent magnet in the form of a disc located between said first mentioned disc and the frame, said magnet comprising an annular ring of magnetic material and an insert by means of which the ring is supported on said bearing member.

2. In a reel, a frame, a spool shaft rotatably supported in said frame, a metallic disc on said shaft outside said frame, a casing cooperating with a part of said frame to enclose said disc, a member rotatably supported on said casing in axial alignment with said shaft, said member including a knob outside the casing engaging the outer wall thereof and a shank extending inside the casing, a friction device supported on said shank and engaging the inner wall of said casing, said knob and said friction device preventing axial movement of said member while permitting rotation thereof by force applied to said knob, a permanent magnet inside said casing and comprising an annular ring of magnetic material, and means supporting said magnet on the shank of said rotatable member in proximity to said disc.

3. In a reel, a frame, a spool shaft, means including a bearing member for supporting said shaft in said frame, a disc of conductive material mounted on said shaft outside said frame, a casing cooperating with a part of said frame to enclose said disc, a rotatable member supported in a bearing on said casing in axial alignment with said shaft, said member comprising an operating knob outside the casing and a shank extending inside said casing, means for preventing axial movement of said rotatable member, two permanent magnets located on opposite sides of said disc, each magnet comprising an annular ring of magnetic material, and means for supporting said magnets on said rotatable member and said bearing member, respectively, in spaced relation to said disc.

4. In a reel, a frame, a spool shaft rotatably mounted in said frame, a disc of conductive material mounted on said shaft outside said frame, a permanent magnet located between said disc and said frame, said magnet comprising an annular ring of magnetic material, a central insert secured to said ring, means including said insert for securing said magnet to said frame in spaced relation to said disc, a casing cooperating with a part of said frame to enclose said disc and magnet, a rotatable member supported on said casing in axial alignment with said shaft, said member comprising a manually operable part outside the casing and a cylindrical part having a bearing in the casing and extending to the inside thereof, a second permanent magnet located on the opposite side of said disc from said first magnet, said second magnet comprising an annular ring of magnetic material having a central insert secured thereto, and means securing said second insert to said cylindrical part to support said second magnet in spaced relation to said disc.

THOMAS B. GIBBS.
GORDON F. LAING.
BERNARD A. WARMEY.

REFERENCES CITED

The following references are of record in the file of this patent:

UNITED STATES PATENTS

| Number | Name | Date |
|---|---|---|
| 681,835 | Soldana | Sept. 3, 1910 |
| 1,875,004 | Horsburgh et al. | Aug. 30, 1932 |
| 2,277,057 | Bach | Mar. 24, 1942 |
| 2,293,748 | Johnson | Aug. 25, 1942 |
| 2,361,239 | Ransom | Oct. 24, 1944 |
| 2,465,932 | Romine | Mar. 29, 1949 |

OTHER REFERENCES

"Permanent Magnets Have Four Major Jobs," article appearing in "Electrical Manufacturing," November 1944 issue, first five pages.